US006723820B1

United States Patent
Arcurio et al.

(10) Patent No.: US 6,723,820 B1
(45) Date of Patent: Apr. 20, 2004

(54) SOLVENT SOLUBLE POLY(URETHANE/UREA) RESINS

(75) Inventors: Ralph Arcurio, Bridgewater, NJ (US); Mark Rocco, Mineola, NJ (US); David J. Slavinski, Linden, NJ (US); Mark Schneider, Dumont, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/710,941

(22) Filed: Nov. 13, 2000

(51) Int. Cl.[7] .............................. C08G 18/10
(52) U.S. Cl. ................ 528/61; 523/160; 524/31; 524/315; 524/503; 524/589; 524/773; 524/874; 156/277; 156/384; 156/385; 156/386; 156/387
(58) Field of Search .......................... 528/61; 523/160; 524/874, 773, 503, 589, 315, 31; 156/277, 384–387

(56) References Cited

U.S. PATENT DOCUMENTS

| | | | | |
|---|---|---|---|---|
| 2,948,707 A | * | 8/1960 | Benning | |
| 3,565,849 A | * | 2/1971 | Peters | |
| 3,645,976 A | * | 2/1972 | Suzuki et al. | |
| 3,752,786 A | * | 8/1973 | Rossitto et al. | |
| 4,590,254 A | * | 5/1986 | Chang et al. | |
| 5,556,925 A | | 9/1996 | Kousaka et al. | 525/440 |
| 6,245,695 B1 | * | 6/2001 | Maruo | |

FOREIGN PATENT DOCUMENTS

| | | | | |
|---|---|---|---|---|
| EP | 0 745 651 | | 12/1996 | ........... C09D/11/00 |
| JP | 4-209674 | * | 7/1992 | |
| WO | WO 93/22360 | | 11/1993 | ........... C08G/18/12 |
| WO | WO 01/14442 A1 | | 3/2001 | ........... C08G/18/10 |

OTHER PUBLICATIONS

Chemical Abstract, vol. 98, No. 12; Mar. 1983; abstract No. 905llt Weatherable polyurethene compositions for artificial leathers; p. 41; col. 1.
Chemical Abstract, vol. 100, No. 18; Apr. 1984; abstract No. 140621m; Urethane rubber with good elastic recovery; p. 70, col. 2.

* cited by examiner

Primary Examiner—Rachel Gorr
(74) Attorney, Agent, or Firm—Sidney Persley

(57) ABSTRACT

Solvent based poly(urethane/urea) resins suitable for formulating flexographic and gravure laminating printing ink and coating compositions formed from a poly(urethane) prepolymer solution made from a blend of polymeric diols and diols reacted with diisocyanates and then with diamine in an organic solvent. The resin is prepared by adding the poly(urethane) prepolymer solution at a controlled rate to the diamine in a organic solvent which allows a resin solution to be formed, which may be used in the formulation of laminating printing ink and coating compositions without the need for adjuvants, grinding in polyvinyl butyral or blending with nitrocellulose base.

49 Claims, No Drawings

SOLVENT SOLUBLE POLY(URETHANE/UREA) RESINS

BACKGROUND OF THE INVENTION

1. Field of the Invention

The present invention relates to a poly(urethane) urea resin and to its use in printing ink compositions. More particularly, the present invention relates to a poly(urethane/urea) resin useful as a binder for formulating printing inks and coatings used in laminating plastic films.

2. Description of Related Art

Recent diversification in package bags or containers has required a high degree of performance for printing inks or coating agents used for the ornamentation or surface protection. Such inks or coating agents should exhibit excellent adhesiveness for various kinds of plastic films and blocking resistance, and excellent adaptability for boiling or retorting treatment. For instance, printing inks for plastic films are needed to provide more excellent printability, adhesion to a wider range of films, and more excellent blocking resistance and gloss than conventional ones.

In the field of food packaging, bags or containers made of laminated film materials are used for the reasons that they are sanitary and their contents do not come in direct contact with the ink and to provide a satisfactory appearance as high grade printed products. Generally there are two methods for producing such laminated film materials: One is an extrusion laminating method, wherein a plastic film substrate is printed with an ink, and if necessary, a primer is applied onto the inked surface; then a molten resin such as polyolefin is extruded onto the inked surface. Another method is an adhesive laminating method, wherein an adhesive is applied onto the inked surface of the plastic film substrate, and a plastic film is then laminated onto the same surface. Accordingly, laminating inks must posses excellent adhesion to the printing substrate as well as adhesiveness (lamination strength) to the film to the laminated. When the laminated film materials further undergo boiling or retorting treatment in which packages are immersed in hot water for the purpose of cooking or sterilization of the contents, such film laminates should not undergo delamination through the retorting treatment. Most of these performance requirements for the printing ink or coating mainly depend upon the performance of the binder resin used. Accordingly, in the case of printing inks for plastic film, one or more of various binder resins are selected so as to meet the performance required for individual printing inks. In general, however, when a binder resin in a film hardens, there is a tendency for the resulting film to have blocking resistance but with reduced adhesion to the plastic film and lamination strength. For instance, when binder resins are used, such as acrylic resins, polyamide resins and polyester resins, an aromatic ring or a highly polar functional group is introduced in the molecule which hardens the resin film. However, such rings and functional groups invite the reduction of adhesion and lamination strength. Accordingly, such resins typically are unsuitable as a binder for a laminating inks and coatings to be applied to a wide variety of films.

Polyurethane resins can be improved both in hardness of the coated film and in adhesion to plastic films by increasing the concentration of urethane bonds in the molecule. An ink containing a polyurethane resin of this type provides good adhesiveness and lamination strength, as compared with inks containing other resins providing ink films having the same hardness. For this reason, polyurethane resins in which the concentration of urethane bond is increased as highly as possible, have been used as binders for printing inks and coatings for use in laminates of plastic films. However, polyurethane resins wherein the concentration of urethane bond is increased highly, fail to give sufficient adaptability for boiling or retorting treatment. To eliminate this problem a two-component reaction type resin system is used composed of one component containing a polyurethane resin and the other component containing a polyisocyanate compound as a curing agent. Nevertheless, the two-component reaction type resin system has various problems as well. Since the main component must be mixed with the curing agent immediately before being used, it is inconvenient in handling, the pot life is short and the remaining ink or coating after printing is unstable. Further, the use of expensive curing agent raises substantially costs of packaging bags or containers.

Plastic film substrates such as those used in laminates, typically are printed using flexographic printing or gravure printing. In flexographic printing, the flexographic ink or coating is applied to the surface of a resilient letter-press image, and the image is then transferred to the plastic print stock. Flexographic inks, for example, typically contain a polar organic solvent such as an alkanol, which dissolves ink binder components but which does not swell or otherwise deteriorate the resilient letter-press image. In gravure printing, the gravure ink is deposited in image wells in the flat surface of a gravure plate, and the deposited ink image is then transferred to the print stock. Since gravure printing typically is carried out at high speeds, the gravure ink typically contains volatile organic solvents such as alkyl esters, which dissolve ink binder components and must be rapidly removed during the drying process. Accordingly, flexographic ink and gravure ink each have specific performance requirements dictated by the distinctly different methods of printing. As a result, the inks and coatings for each application are formulated to meet those requirements including specific binder components designed specifically for flexographic inks or for gravure inks. Such specific binder components which are specifically designed for one ink type, have been found to be incompatible in solvent systems of the other ink type, which has necessitated the preparation and storage of two distinct ink systems with there attendant expense.

While there continues to be a need for an improved laminating ink and coating in general, there also is a clear industry need for a single binder resin system which can be used to formulate inks and coatings useful for both flexographic and gravure printing applications.

SUMMARY OF THE INVENTION

The above mentioned industry needs are met by the solvent-soluble poly(urethane/urea) resin of this invention which is derived from a polyurethane prepolymer being the reaction product of: a diisocyanate component; and, a diol component having (i) a first diol having a molecular weight below 2000; and (ii) a polymeric diol having a molecular weight below 3000; wherein the —NCO/—OH ratio is less than 2; the polyurethane prepolymer contains 1.3 to 6.0 wt. % of unreacted —NCO groups; and 80 to 120% of a diamine, based on the equivalents of the unreacted —NCO groups; whereby the resulting poly(urethane/urea) resin is soluble in organic solvent.

An added embodiment of this invention is an improved method of producing a poly(urethane/urea) resin involving the steps of: (a) preparing a polyurethane prepolymer solution by reacting a diisocyanate component, a diol component, and a condensation polymerization catalyst in an organic solvent; wherein the polyurethane prepolymer contains unreacted —NCO groups; and (b) reacting the polyurethane prepolymer with a diamine; wherein the improvement comprises:

preparing a diamine solution comprised of diamine and a solvent mixture having an alcohol solvent and a second organic solvent; and adding, at a controlled rate, the polyurethane prepolymer solution into the diamine solution to form a poly(urethane/urea) resin.

A further embodiment of this invention is a solvent-based laminating ink useful in flexographic and/or gravure printing comprising: (A) a solvent-soluble poly(urethane/urea) resin which is derived from a polyurethane prepolymer being the reaction product of: a diisocyanate component; and, a diol component having (i) a first diol having a molecular weight below 2000; and (ii) a polymeric diol having a molecular weight below 3000; wherein the —NCO/—OH ratio is less than 2; the polyurethane prepolymer contains 1.3 to 6.0 wt. % of unreacted —NCO groups; and wherein the poly (urethane/urea) resin is formed by reacting the polyurethane prepolymer with 80 to 120% of the diamine based on the equivalents of the unreacted —NCO groups;

(B) a colorant; and (C) an organic solvent.

A further embodiment of this invention is a solvent-based coating useful in flexographic and/or gravure printing comprising: (A) a solvent-soluble poly(urethane/urea) resin which is derived from a polyurethane prepolymer being the reaction product of: a diisocyanate component; and a diol component having (i) a first diol having a molecular weight below 2000; and (ii) a polymeric diol having a molecular weight below 3000; wherein the —NCO/—OH ratio is less than 2 and the polyurethane prepolymer contains 1.3 to 6.0 wt. % of unreacted —NCO groups; and (B) an organic solvent; wherein the poly(urethane/urea) resin is formed by reacting the polyurethane prepolymer with a diamine present in about 80 to 120% based on the equivalents of unreacted —NCO groups.

A still further embodiment of this invention is a method for printing an image on a polymeric substrate comprising: (a) image wise printing the laminating ink of this invention described supra, onto a surface of the polymeric substrate; and (b) drying the image to form an image which is tack-free, firmly adherent to the substrate, and un-blocked when contacted under pressure at ambient temperatures to a second surface of the substrate.

DETAILED DESCRIPTION OF THE INVENTION

The present invention relates to solvent based multipurpose poly(urethane/urea) resin suitable for formulating flexographic and gravure printing compositions. The poly (urethane/urea) resin is formed from a poly(urethane) prepolymer comprising a blend of high molecular weight polymeric diols and low molecular weight diols reacted with diisocyanates. This polyurethane prepolymer containing unreacted isocyanate groups is further extended with a diamine to form the poly(urethane/urea) resin. The poly (urethane/urea) resin is soluble in an organic solvent such as ester and alcohol/ester solvents and is particularly useful in formulating packaging laminating inks. This resin's exceptional solubility in ester and alcohol/ester solvents allows for the formulation of a single ink or coating composition for both flexographic and gravure applications with only minor formulation modifications. The poly(urethane/urea) resin of the present invention or coating can be formulated into an ink compositions without any adjuvants or by grinding in polyvinyl butyral or blending with nitrocellulose base. As used herein the term "nitrocellulose base" is intended to have its conventional meaning of a pigment dispersed with nitrocellulose in organic solvent and ground to a desired particle size, typically 10 microns or smaller. Laminating ink and coating compositions formed with the poly(urethane/ urea) resin of this invention exhibit excellent extrusion bond strengths, block resistance, printability, resolubility, retort capability, and superior adhesion on a wide variety of films (substrates) compared to laminating inks and coatings made with conventional and commercially available resin binder systems.

Solvent-Soluble Poly(Urethane/Urea) Resin

The solvent-soluble poly(urethane/urea) resin of the present invention is derived from a condensation of poly (urethane) prepolymer containing 1.3 to 6.0 wt % of unreacted isocyanate (i.e., —NCO) groups and 80% to 120% of a diamine based on the equivalents of the unreacted —NCO groups. The resulting poly(urethane/urea) resin has the structure:

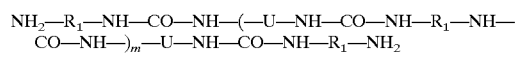

Wherein R1 is a covalent bond or a C1–10 alkyl group, m has the value of 4 and —U— has the structure:

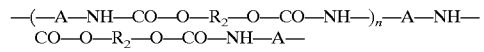

wherein —A— is an aryl or alkyl group; R2 comprises R3 and R4, wherein R3 is an alkyl or a polymeric group having a molecular weight below 2000, and wherein R4 is a polymeric group having a molecular weight below 3000, and n has the value of 1 or 2. Typically, the molecular weight of R3 is less than the molecular weight of R4, and the molar ratio of R4 to R3 ranges between about 90:10 and about 10:90. A preferred ration of R4 to R3 is about 55:45. Preferably, the resin has a molecular weight between about 10,000 and about 80,000.

Condensation Poly(Urethane) Prepolymer

The polyurethane prepolymer is a condensation reaction product of a diisocyanate component and a diol component in which the —NCO/—OH ratio is less than 2. As used herein the "—NCO/—OH ratio" is intended to mean the ratio of equivalents of —NCO groups in the diisocyanate component, to equivalents of —OH in the diol component. The —NCO/—OH ratio is sometimes identified as the isocyanate index (I.I.). Preferably, the —NCO/—OH ratio is between about 1 and 2, and more preferably 1.5. The polyurethane prepolymer has the structure:

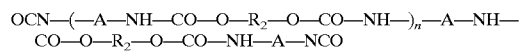

wherein —A— is an aryl or alkyl group; $R_2$ is $R_3$ and $R_4$; wherein $R_3$ is an alkyl or a polymeric group having a molecular weight below 2000; wherein $R_4$ is a polymeric group having a molecular weight below 3000, and n has the value of 1 or 2. As indicated above, the polyurethane prepolymer contains 1.3 to 6% by weight of unreacted —NCO groups which are represented in this polyurethane structure. In particular, the nitrogen content of the solvent-soluble poly(urethane/urea) resin of the present invention is from 1.3 to 6.0% by weight. Typically, the molecular weight of $R_3$ is less than the molecular weight of $R_4$, and the molar ratio of $R_4$ to $R_3$ ranges between about 90:10 to about 10:90; and preferably, $R_2$ contains from about 30 to about 80 equivalent % of $R_4$, and the ratio of $R_4$ to $R_3$ is about 55:45.

Any conventional condensation polymerization catalyst may be used to form the poly(urethane/urea) solution of this invention including triethylenediamine, dibutyltindilaurate, and the like. Preferably the catalyst is dibutyltindilaurate.

Diisocyanate Component

The diisocyanate component may be a single diisocyanate compound or it may comprise two or more diisocyanate compounds. It may also be an aromatic compound, an aliphatic compound, or a mixture thereof. In the preparation of the prepolymer, a number of aryldiisocyanates or alkyldiisocyanates may be used, such as 4,4'-diphenylmethane diisocyanate; 4,4'-dicydohexyl diisocyanate; hexamethylene diisocyanate; meta-tetramethylene-xylenediisocyanate; isophorone diisocyanate; toluene diisocyanate and the like. A preferred aliphatic diisocyanate is isophorone diisocyanate (IPDI). Preferred aromatic diisocyanates include toluene diisocyanate (TDI) in isomer blends of 80/20 and 65/35. The TDI isomers are toluene 2,4-diisocyanate and toluene 2,6-diisocyanate. Typically, 10 to 20 parts by weight diisocyanate component is used.

Diol Component

The diol component comprises a first diol having a molecular weight below 2000; and a polymeric diol having a molecular weight below 3000. Although these molecular weight ranges overlap, the first diol typically will have a lower molecular weight than the polymeric diol; however, in some instances the molecular weights of the first and polymeric diols may be substantially the same such as when two diol polymers have a molecular weight of 2000 or less. Preferably the polymeric diol comprises 30 to 80% of the equivalents of the diol component. The first or low molecular weight diols may be selected from the group consisting of aliphatic diols, polyether diols and polycaprolactone diols. These short chain diols should have molecular weight less than 2000. Preferred short chain diols include 1,4-butanediol; 1,5-pentanediol; and alpha-hydro-omega-hydroxy-poly(oxy-1,4-butyldiyl) having a molecular weight of 1000.

The polymeric diol preferably has molecular weight ranging from about 425 to about 3000 and is selected from the group consisting of polyether diols and polycaprolactone diols. In the preparation of the poly(urethane/urea) prepolymer, a number of long chain polyether diols may be used, such as polytetrahydrafuran (pTHF) of molecular weights. 650, 1000 or 2000; and polypropylene glycol (PPG) of molecular weights 425, 725, 1025 or 2025. A number of polycaprolactone diols having molecular weights of 2000 or 1000 may also be used. Preferably, the polymeric diol is selected from the group consisting of alpha-hydro-omega-hydroxy-poly(oxy-1,4-butyldiyl), and polypropylene glycol.

The polymeric dial and the first preferably lower molecular weight diol, make up the diol component of the prepolymer. Although, this diol component contains 30 to 80 to molecular equivalents of polymeric diol for every 100 molecular equivalents of total diol in the diol component; a preferred ratio of polymeric diol to first diol is 55.45 in a diol component of 100 molecular equivalents. Each molecular equivalent of polymeric diol typically has a greater molecular weight than an equivalent of first diol. The prepolymer is prepared from about 40 parts by weight of the polymeric diol and about 2 parts by weight first diol, along with 10 to 20 parts by weight diisocyanate component and the remainder solvent.

Diamine Extension

The polyurethane prepolymer is chain extended by reacting it with a difunctional amine in an organic solvent. The extension reaction is carried out with 80 to 120% equivalence of the diamine, based on the equivalents of unreacted —NCO groups on the prepolymer to form the above described solvent soluble poly(urethane/urea). Typically, the extension reaction is carried out with from about 80% to about 120% of diamine, or more preferably with about 102% to about 120% diamine. Preferably, more than 100% of diamine is used to extend the prepolymer to form the solvent soluble poly(urethane/urea) of this invention, with 112% diamine being particularly preferred.

A number of diamines may be used including hydrazines and $C_{1-10}$ alkylene diamines such as methylene diamine, ethylene diamine, diamino cyclohexane, hexamethylene diamine, piperazine, isophorone diamine, or the like. Particularly preferred diamines are ethylene diamine, isophorone diamine, or mixtures thereof.

For extension reactions in which there are less than 100% diamine based on equivalents of unreacted —NCO groups, a conventional batch process may be used in which the reaction components are all mixed and reacted in a single reaction vessel. However, when the diamine concentration nears 100%, insoluble gel formation can occur in such batch processes. For extension reactions where there is more than 100% diamine used based on equivalents of unreacted —NCO groups, a "two-kettle" reaction process is used which surprisingly precludes any gel formation.

In the "two-kettle" process, the polyurethane prepolymer solution is prepared by reacting a diisocyanate component, a diol component, and a condensation polymerization catalyst in an organic solvent. The diol component preferably comprises a first diol having a molecular weight-below 2000; and, a polymeric diol having a molecular weight below 3000 each hereinabove described. Preferably, the —NCO/—OH ratio is less than 2. The polyurethane prepolymer solution produced by this initial condensation reaction contains a polyurethane prepolymer having unreacted —NCO groups; preferably the prepolymer has 1.3 to 6.0% by weight of unreacted —NCO groups. A diamine solution is then prepared by dissolving a diamine in a process solvent mixture containing an alcohol and an organic solvent. Preferably, this diamine solution contains up to about 120% of the diamine based on the equivalents of the unreacted —NCO groups; and preferably the solvent mixture contains between about 10% to about 75% of the alcohol solvent. The polyurethane prepolymer solution is then added to the diamine solution at a controlled rate to-react the two. The addition is at a rate effective to avoid gelling and form a solution of the poly(urethane/urea) resin of this invention.

In the "two kettle" process, the organic solvent used for the polyurethane prepolymer may be the same as the second organic solvent used as in the process solvent, or alternatively it may be a mixed solvent similar to the process solvent. Surprisingly, the alcohol in the processing solvent mixture does not interfere with the extension reaction. A number of organic solvents may be used as the solvent and/or process solvent for the condensation and chain extension reactions. Useful organic solvents for these reactions include ester solvents such as ethyl acetate or n-propyl acetate, or an ester/alcohol blend. A number of alcohol solvents may be used such as methanol, ethanol, n-propanol, isopropanol, butanol, and the like.

By the method of this invention, a solution of poly(urethane/urea) resin is formed and gel formation is avoided. Typically, the poly(urethane/urea) resin solution contains enough solvent, e.g., alcohol and ester solvent mixture, to give about 25 to about 40 parts by weight of final resin solids. The resulting poly(urethane/urea) resin of this invention typically has a molecular weight between about 10,000 and about 80,000; and the solution typically has a viscosity between about 150 and about 5000 cps at room temperature, and an amine value of 1 to 15 with a value of about 7 being preferred.

Solvent-Based Laminating Ink

The solvent-based laminating ink of this invention comprises the solvent-soluble poly(urethane/urea) resin of this invention; a colorant; and an organic solvent. The ink system of this invention has a unique characteristic in that it may be used in either flexographic or gravure printing by simply making minor adjustments to the formulation (e.g. solvent and viscosity adjustments). In particular, the ink of this invention comprises, based on the weight of the ink: about 15 wt. % to about 50 wt. % of the solvent-soluble poly(urethane/urea) resin; about 6 wt. % to about 30 wt. % of the colorant; and about 10 wt. % to about 60 wt. % of the organic solvent; and component concentrations may be adjusted for use in flexography or gravure printing. Preferably, the gravure ink comprises, about 8 wt. % to about 60 wt. % of the solvent-soluble poly(urethane/urea) resin; about 3 wt. % to about 30 wt. % of the colorant; and about 15 wt. % to about 60 wt. % of the organic solvent such as alkyl ester solvent; and the flexographic ink comprises, about 8 wt. % to about 60 wt. % of the solvent-soluble poly(urethane/urea) resin; about 3 wt. % to about 30 wt. % of the colorant; and about 15 wt. % to about 60 wt. % of the organic solvent such as an alkanol solvent. The ink preferably has a viscosity between about 15 seconds to about 30 seconds, as measured in a #2 efflux cup. Efflux cup measurements are conventional methods for measuring ink viscosities and involves timing the flow of a calibrated quantity ink through a calibrated orifice. The lower viscosity inks typically are used in gravure printing and the higher viscosity inks typically are used in flexographic printing. Thus when the ink has a viscosity of about 28 seconds as measured in a #2 efflux cup, it is suitable for flexographic printing; and when the ink has a viscosity of about 18 seconds as measured in a #2 efflux cup, and is suitable for gravure printing.

Colorant

The inks of this invention contain one or more colorants such as soluble dyes, pigments or mixtures thereof. Such inks typically contain one or more pigments dispersed therein.

The pigment may be any conventional organic or inorganic pigment such as Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 170, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, Pigment Black 7, titanium dioxide, carbon black, and the like. Pigment compositions which are also useful in the energy curable inks of this invention are described in U.S. Pat. Nos. 4,946,508; 4,946,509; 5,024,894; and 5,062,894 each of which is incorporated herein by reference. Such pigment compositions are a blend of the pigment along with a poly(alkylene oxide) grafted pigment.

The classes of dyes suitable for use in present invention are selected from acid dyes, natural dyes, direct dyes either cationic or anionic direct dyes, basic dyes, and reactive dyes.

The acid dyes, also regarded as anionic dyes, are soluble in water and mainly insoluble in organic solvents and are selected, from yellow acid dyes, orange acid dyes, red acid dyes, violet acid dyes, blue acid dyes, green acid dyes, and black acid dyes. European Patent 0 745 651, incorporated herein by reference, describes a number of acid dyes which are suitable for use in the present invention. The yellow acid dyes selected include Acid Yellow 1 (C.I. 10316); Acid Yellow 7 (C.I. 56205); Acid Yellow 17 (C.I. 18965); Acid Yellow 23 (C.I. 19140); Acid Yellow 29 (C.I. 18900); Acid Yellow 36 (C.I. 13065); Acid Yellow 42 (C.I. 22910); Acid Yellow 73 (C.I. 45350); Acid Yellow 99 (C.I. 13908); Acid Yellow 194; and Food Yellow 3 (C.I. 15985). The orange acid dyes selected include Acid Orange 1 (C.I. 13090/1); Acid Orange 10 (C.I. 16230); Acid Orange 20 (C.I. 14603); Acid Orange 76 (C.I. 18870); Acid Orange 142; Food Orange 2 (C.I. 15980); and Orange B. The red acid dyes selected include Acid Red 1 (C.I. 18050); Acid Red 4 (C.I. 14710); Acid Red 18 (C.I. 16255); Acid Red 26 (C.I. 16150); Acid Red 27 (C.I. 16185); BASOVIT™ 425E (available from BASF Corporation) a xanthone based acid dye also known as Acid Red 51 (C.I. 45430); Acid Red 52 (C.I. 45100); Acid Red 73 (C.I. 27290); Acid Red 87 (C.I. 45380); Acid Red 94 (C.I. 45440); Acid Red 194; and Food Red 1 (C.I. 14700). The violet acid dyes selected include Acid Violet 7 (C.I. 18055); and Acid Violet 49 (C.I. 42640). The blue acid dyes selected include Acid Blue 1 (C.I. 42045); Acid Blue 9 (C.I. 42090); Acid Blue 22 (C.I. 42755); Acid Blue 74 (C.I. 73015); Acid Blue 93 (C.I. 42780); and Acid Blue 158A (C.I. 15050). The green acid dyes selected include Acid Green 1 (C.I. 10028); Acid Green 3 (C.I. 42085); Acid Green 5 (C.I. 42095); Acid Green 26 (C.I. 44025); and Food Green 3 (C.I. 42053). The black acid dyes selected include Acid Black 1 (C.I. 20470); Acid Black 194 (BASANTOL™ X80, available from BASF Corporation, an azo/1:2 CR-complex also known as.

The direct dyes selected for use in the present invention include Direct Blue 86 (C.I. 74180), Direct Red 199, Direct Red 168, Direct Red 253 (C.I. Not Assigned) and Direct Yellow 107/132 (C.I. Not Assigned). The direct dyes are commonly used in coloration of pulp paper.

The natural dyes selected for use in the present invention include Alkanet (C.I. 75520,75530); Annatto (C.I. 75120); Carotene (C.I. 75130); Chestnut; Cochineal (C.I. 75470); Cutch (C.I. 75250, 75260); Divi-Divi; Fustic (C.I. 75240); Hypernic (C.I. 75280); Logwood (C.I. 75200); Osage Orange (C.I. 75660); Paprika; Quercitron (C.I. 75720);

Sanrou (C.I. 75100); Sandal Wood (C.I. 75510, 75540, 75550, 75560); Sumac; and Tumeric (C.I. 75300).

The reactive dyes selected for use in the present invention include Reactive Yellow 37 (monoazo dye); Reactive Black 31 (disazo dye); Reactive Blue 77 (phthalo cyanine dye) and Reactive Red 180 and Reactive Red 108 dyes.

Preference is given to the use of acid dyes such as, for example, Acid Black 194; Acid Red 51, Acid Blue 9; Acid Green 26; Acid Yellow 36, Acid Orange 142, Direct Blue 86, Direct Red 253 and Direct Yellow 107/132 dyes.

Organic Solvent

A number of organic solvents may be used in conjunction with formulating the laminating inks of this invention. Useful organic solvents include ester solvents such as ethyl acetate or n-propyl acetate, or a polar solvent such as an ester/alcohol mixture. A number of alcohol solvents may be used such as, ethanol, n-propanol, glycols, and the like. Preferably, the ink formulating solvent is similar to or the same as the process solvent described supra in connection with the preparation of the poly(urethane/urea) resin.

Adjuvants

The solvent based laminating inks of this invention may also contain the usual adjuvants to adjust flow, surface tension and gloss of a cured coating or printed ink. Such adjuvants typically are polymeric dispersants, surface active agents, waxes, or a combination thereof. These adjuvants may function as leveling agents, wetting agents, dispersants, defrothers or deareators, or additional adjuvants may be added to provide a specific function. Preferred adjuvants include polymeric dispersants or bonding agents such as polyvinyl butyral, or nitrocellulose, fluorocarbon surfactants such as FC-430, a product of the 3M company; silicones, such as DC57, a product of Dow Chemical Corporation; polyethylene wax; polyamide wax; polytetrafluoroethylene wax; and the like.

In a preferred embodiment of the invention, the laminating inks contain a polymeric dispersant which is employed to disperse the pigment during mixing and grinding operations in the solvent. All components of the ink may be blended together and ground to reduce the pigment particles to the desired size distribution, typically 10 microns or less; or alternatively the pigment and the polymeric dispersant can be premixed and ground in the solvent to form a "base" which is subsequently blended with the remaining components of the ink composition. The ink components may be mixed in a high speed mixer, e.g., a Hockmeyer mixer, until a slurry consistency is reached and then passed through a media mill, e.g., an Eiger a horizontal media mill, until the pigment is reduced to 10 microns or smaller. The wide versatility of the poly(urethane/urea) resin of this invention provides ink and coating formulations that may be prepared without a polymeric dispersant, but preferably with a polymeric dispersant such as by either grinding in polyvinyl butyral (PVB), or blending with a nitrocellulose (N/C) base as hereinabove described. Thus, the ink or coating of this invention may contain 0 to about 12 parts by weight of the polymeric dispersant. In particular, one ink system of this invention is prepared by grinding the poly(urethane/urea) resin in PVB. In this instance, the PVB serves as a dispersing aid and serves to improve extrusion bonds to polypropylene films. Preferably, the PVB formulation is prepared from: about 10 to about 20 parts by weight pigment; about 25 to about 50 parts by weight poly(urethane/urea); about 2 to about 15 parts by weight 25% PVB solution; 0 to about 0.5 parts by weight calcium carbonate and 0 to about 0.5 parts by weight colloidal silica, e.g., Syloid® silica. Calcium carbonate and colloidal silica are typically added to improve the ink block resistance. Typically the PVB formulation also contains about 10 to about 50 parts by weight of organic solvent. In another embodiment of the present invention, the ink system may be prepared by blending the poly(urethane/ urea) resin in nitrocellulose (N/C) bases. The N/C bases are mixed with the neat poly(urethane/urea) resin of this invention, solvent, and other additives, including wax and co-solvent. Typically the N/C base is composed of about 3 to about 15 parts by weight nitrocellouse, about 12 to about 30 parts by weight pigment, and about 55 to about 82 parts by weight solvent; which are mixed in a high speed mixer until a slurry consistency is reached and then passed through a media mill until the pigment is reduced to 10 microns or, smaller. Typically, this N/C base formulation further contains about 0.5 to about 1.5 parts by weight wax. Thus, the N/C base may be composed of about 9.00% nitrocellouse, about 25.00% pigment, and about 66.00% organic solvent (e.g. ethyl acetate). The N/C base system provides laminating bond strength, printability and resolubility.

Method of Printing a Laminating Ink

In one embodiment of the invention, the laminating ink as described supra is imagewise printed onto a surface of a polymeric substrate-and forms a dried ink image which is tack-free, firmly adherent to the surface of the substrate, and un-blocked when contacted under pressure at ambient temperatures to a second surface of the substrate.

Although any polymeric substrate may be printed with this method, preferred polymeric substrates include a sheet of polyethylene, polypropylene, polyethylene terephthalate, cellulose acetate, cellulose acetate butyrate, polycarbonate, polyamide, PVDC coated polyethylene terephthalate, PVDC coated polypropylene, metallized polyethylene terephthalate, or metallized polypropylene. Particularly preferred film substrates used for lamination are oriented polypropylene and treated polyester films.

In a preferred embodiment of the invention, a second substrate may be applied or laminated to the dried ink image on the first substrate by any conventional method. Thus, the second substrate may be applied as an extruded melt onto the dried image to form the second substrate; or a preformed second substrate may be laminated to the dried ink image through an adhesive surface. The second substrate may be composed of the same material as the first substrate or it may be different depending on the nature of the end use of the printed laminate. Preferably the second substrate is a polyethylene. In many instances the second substrate is the same as the polymeric substrate.

An additional embodiment of the present invention further comprises the step of subjecting the printed laminate to retort conditions to form a retorted laminate, wherein the ink image remains substantially unchanged and wherein the retorted laminate is free of delamination defects. In this embodiment, the printed laminate can be, at least in part, as a packaging material for contents (e.g., such as foods, medicinals and the like) which are processed insitu at elevated temperatures by retorting. As used herein the term "retort" is intended to include operations and conditions in which laminates, or packaged contents, are heated under prescribed conditions such as boiling in water; heating in an autoclave, or an oven, or a microwave and with Infrared radiation; or the like. A typical retorting operation commonly used in the food packaging industry involves heating in water at 180° F. (about 82° C.) for 45 minutes.

The following examples further illustrate details of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all part and percentages are by weight.

Example 1

An extended poly(urethane/urea) resin of this invention was formed from a polycaprolactone prepared from the components listed in Tables 1 and 2 using the procedures described herein below.

TABLE 1

| Prepolymer | |
|---|---|
| Material | Wt. % |
| Tone 2221[a] | 38.94 |
| 1,4 Butanediol | 1.75 |
| Vestanat IPDI[b] | 19.42 |
| n-Propyl acetate | 39.83 |
| Tin Catalyst[c] | 0.06 |

[a]Tone 2221 is polycaprolactone with molecular weight 1000; a product of Union Carbide.
[b]Vestanat IPDI is isophorone diisocyanate; a product of Huls.
[c]Tin Catalyst is dibutyltindilaurate; a product of Air Products.

The Tone 2221, 1, 4 butanediol, Vestanat IPDI and 14.94% Wt. n-propyl acetate were weighed into a clean dry 2 liter flask. The mixture was blanketed with nitrogen, attached to a condenser and agitated. Using a heating mantle, the batch was slowly heated to between 60° C. and 95° C. and held at that temperature for 1.0 to 1.5 hrs. The tin catalyst was then added, and the temperature was maintained at 60° C. to 95° C. until the theoretical free NCO value of the prepolymer was reached (3.0–3.3%), between about 2 to 10 hours. When the reaction reached 3.0–3.3% free NCO, the remaining 24.89% Wt. n-propyl acetate was added which brought the prepolymer solids to about 60 parts by weight. The prepolymer batch was then cooled to a temperature between 65° C. and 25° C. prior to extension.

TABLE 2

| Extension | |
|---|---|
| Material | Wt. % |
| Ethanol | 48.97 |
| n-Propyl acetate | 2.89 |
| Ethylene diamine | ~0.91 |
| Poly(urethane/urea) prepolymer solution | 47.23 |

For the extension reaction, ethanol and n-propyl acetate were weighed into a second flask. The % weight of ethylene diamine (~0.91% Wt.) was determined to provide enough diamine to chain extend the prepolymer to 112%. This amount of diamine was 112% of the equivalents of unreacted —NCO groups. The diamine was added to the solvent mixture, and mixed for about 5 minutes. The prepolymer was then added to the mixture of ethylene diamine and solvent over 10 to 30 minutes, and the solution was then mixed for approximately 1 hour. The solution cooled to room temperature during this time. The resulting poly(urethane/urea) dispersion had a non-volatiles content of 29.5% to 34% by weight and a viscosity of about 250 to about 800 cps at room temperature (Mw=17,000=40,000) (Amine Value=4–8).

Example 2

An extended poly(urethane/urea) resin of this invention was formed from a polytetrahydrafuran prepared from the components listed in Tables 3 and 4 using the procedures described herein below.

TABLE 3

| Prepolymer | |
|---|---|
| Material | Wt. % |
| polyTHF 1000[d] | 37.19 |
| 1,4 Butanediol | 2.74 |
| Vestanat IPDI[b] | 11.25 |
| TDI-80 (type II)[e] | 8.82 |
| n-Propyl acetate | 40.00 |

[d]polyTHF 1000 is alpha-hydro-omega-hydroxy-poly(oxy-1,4-butyldiyl) having a MW of about 1000; a product of BASF.
[e]TDI-80 (type II) is an 80%/20% isomer blend of Toluene 2,4-diisocyanate and Toluene 2,6-diisocyanate The poly THF 1000, 1,4 butanediol, and n-propyl acetate were weighed into a clean dry reactor fitted with a reflux condenser and blanked with a low nitrogen sparge. The reactor was slowly heated to between 45° C. and 55° C. for at least 30 minutes, and then the Vestanant IPDI and TDI-80 were added to the reactor. The batch was slowly heated to 70° C.–85° C. at a rate of 1° C. per minute and then was maintained at temperatures below 100° C. When the temperature reached 75° C.–85° C., the batch was checked for free NCO content every 30 minutes. The reaction was continued for about 2 to 3 hours until the percent of free NCO was 2.70%–3.00%. When the percent of free NCO indicated the reaction had completed, the batch was cooled to 60°–65° C. The resulting batch of prepolymer was sampled for percent —NCO and percent non-volatiles and held at 60°–65° C.

TABLE 4

| Extension | |
|---|---|
| Material | Wt. % |
| n-Propanol | 35.00 |
| n-Propyl acetate | 15.73 |
| Ethylene diamine | 1.09 |
| Poly(urethane/urea) prepolymer | 48.21 |

For the extension reaction the n-propanol and n-propyl acetate were weighed into a clean, dry dispersion reactor at room temperature. The % weight of ethylene diamine (1.09% Wt.) was determined to provide enough diamine to chain extend the prepolymer to 112%. This amount of diamine was 112% of the equivalents of unreacted —NCO groups. The diamine was added to the solvent mixture, and mixed for about 5 minutes at a temperature of 20°–30° C. The prepolymer was added to the solution over about 10 to about 30 minutes and the temperature in the reactor increased to 40°–55° C. and maintained below 55° C. After all transfers were complete the batch was held at 40° C. for one hour to form the batch of poly(urethane/urea) resin. The resulting poly(urethane/urea) dispersion had a solids content of 30% to 35% by weight, a viscosity of about 550 cps at room temperature, an Amine Value of 7 and a Mw of 17,000–40,000.

Example 3

A solvent-based, poly(urethane-urea) resin of this invention was prepared from the components listed in Tables 5 and 6 using the procedures described herein below.

TABLE 5

Prepolymer

| Material | Wt. % |
| --- | --- |
| polyTHF 1000[(d)] | 14.60 |
| polyTHF 2000[(f)] | 35.80 |
| Isophorone Diisocyanate | 5.40 |
| Toluene Diisocyanate | 4.20 |
| n-Propyl Acetate | 40.00 |

[(f)]polyTHF 2000 is alpha-hydro-omega-hydroxy-poly(oxy-1,4-butyldiyl) having a molecular weight of about 2000; a product of BASF.

The poly THF 1000, poly THF 2000, and n-propyl acetate were added to a clean dry reactor fitted with a reflux condenser and blanketed with a low nitrogen purge. The reactor was slowly heated to 45°–55° C. for at least 30 minutes, and then the isophorone diisocyanate and the toluene diisocyanate were added to the reactor. The batch was slowly heated to 80–85° C. at a rate of 1 degree per minute and then was maintained at temperatures below 100° C. When the temperature reached 80°–85° C., the batch was checked for free NCO content every 30 minutes. The reaction was continued for about 2 to 3 hours until the % NCO was 1.36–1.56%, at which point the batch was cooled to 60°–65° C. The resulting batch of prepolymer was then sampled for % —NCO and % non-volatiles and held at 60°–65° C.

TABLE 6

Extension

| Material | Wt. % |
| --- | --- |
| n-Propanol | 35.00 |
| n-Propyl Acetate | 15.35 |
| Ethylenediamine | 0.53 |
| Pre-Polymer | 49.12 |

For the extension reaction, the n-propanol and n-propyl acetate were charged into a clean, dry dispersion reactor at room temperature. The ethylene diamine was added to the reactor and mixed at a temperature of 20°–30° C. The prepolymer batch was added to the reactor over 15 minutes and the temperature in the reactor increased to 40°–45° C. The temperature in the reactor remained below 55° C. After all transfers were complete the batch was held at 40° C. for 1 hour to form the batch of poly(urethane/urea) resin. The batch contained 30% by weight solids, had a viscosity of about 550 cps, and had an amine value of 7.

The following examples illustrate ink formulations of the invention. As illustrated in the following examples, the poly(urethane/urea) resins of this invention (as previously exemplified in Examples 1–3) possess a wide range of compatibility with diverse solvents such as alkyl acetates, alcohols, alkyl acetate/alcohol mixtures, etc.; as well as with diverse polymeric dispersants such as polyvinylbutyral, nitrocellulose, or the like. Especially noteworthy is the ability of these poly(urethane/urea) resins to resolubilize in solutions ranging from all ester such as used in gravure inks, to alcohol rich alcohol/ester blends, such as required for flexographic ink formulations. This unique range of resolubility is essential for the formulation of both gravure inks and flexographic inks from the same poly(urethane/urea) resin.

Example 4

This example illustrates that the poly(urethane/urea) resin of Examples 1–3 may be formulated into ink for applications requiring pasteurization or retort without added polymeric dispersants or cross-linkers. An example of such a formulation is shown in the Table 7.

TABLE 7

| Material | Wt. % |
| --- | --- |
| Poly(urethane/urea) from Example 1, 2, or 3 | 45.00 |
| Pigment | 13.00 |
| Solvent | 42.00 |
| | 100.00 |

The ink may be prepared by mixing the above materials in a high speed mixer (Hockmeyer) until a slurry consistency is reached (about 30 minutes). The slurry is then passed through horizontal media mill (Eiger) until the pigment is reduced to 10 microns or smaller. When an ester solvent is used, such as n-propyl acetate, the resulting ink may be used in gravure printing operations; when an alcohol solvent is used, such as ethanol/propanol mixtures, the ink may be used for flexographic printing operations; and when a mixed ester/alcohol solvent is used, such as n-propyl acetate/n-propyl alcohol, the ink may be used in either gravure or flexographic printing operations by adjusting the ester/alcohol ratio.

Examples 5–8

In each of these examples a gravure ink or a flexographic ink was prepared using the poly(urethane/urea) of Example 3 and polyvinyl butyral as the polymeric dispersant. Table 8 contains the components of the ink formulations prepared.

TABLE 8

| Example # | 5 | 6 | 7 | 8 |
| --- | --- | --- | --- | --- |
| Pigment color | Blue | Red | Blue | Red |
| Ink Type | Flexographic | Flexographic | Gravure | Gravure |
| Pigment | 13.00% | 11.50% | 13.00% | 11.50% |
| Poly(urethane/urea) of Example 3 | 40.00% | 44.00% | 40.00% | 44.00% |
| Ethanol | 22.00% | 20.00% | — | — |
| n-propanol | 22.00% | 21.50% | — | — |
| n-propyl acetate | — | — | 44.00% | 41.50% |
| 25% polyvinyl butyral solution | 2.00% | 2.00% | 2.00% | 2.00% |
| Calcium carbonate | 0.50% | 0.50% | 0.50% | 0.50% |
| Syloid | 0.50% | 0.50% | 0.50% | 0.50% |
| TOTAL | 100.00% | 100.00% | 100.00% | 100.00% |

In each instance the blue pigment was Pigment Blue 15:4 and the red pigment was Pigment Red 53:1. The components of each ink formulation were mixed in a high speed mixer (Hockmeyer) until a slurry consistency was reached (about 30 minutes). Each slurry was then passed through a horizontal media mill (Eiger) until the pigment is reduced to 10 microns ($\mu$m) or smaller to form the respective inks. Similar inks were prepared as described above except that the poly(urethane/urea) resin of Example 3 was replaced with that of Example 1 or Example 2. Each ink formulation was printed on polyester film print stock using a respective flexographic printing press or gravure printing press to produce acceptable printed images.

Example 9

In this example a gravure ink or a flexographic ink was prepared using the poly(urethane/urea) of Example 3 and nitrocellulose as the polymeric dispersant. Table 9 contains the general components of the ink formulations prepared.

TABLE 9

| Material | wt. % |
|---|---|
| Nitrocellulose Base | 60.00 |
| Poly(urethane/urea) of Example 3 | 35.00 |
| Solvent | 5.00 |
| | 100.00 |

Nitrocellulose base (hereinafter N/C Base) was composed of 9.00% nitrocellouse, 25.00% Pigment Blue 15:4, 66.00% solvent which were mixed in a high speed mixer (Hockmeyer) until a slurry consistency was reached (about 30 minutes). The slurry was then passed through a horizontal media mill (Eiger) until the pigment is reduced to 10 microns or smaller. The N/C Base was then blended with the remaining components to form the ink. To form a gravure ink, the solvent was n-propyl acetate, and to form a flexographic ink the solvent was a mixture of 80% n-propyl alcohol and 20% n-propyl acetate. Similar inks were prepared as described above except that the poly(urethane/urea) resin of Example 3 was replaced with that of Example 1 or Example 2. Each ink formulation was printed on polypropylene print stock using a respective flexographic printing press or gravure printing press to produce acceptable commercial printed images.

Examples 10–12

In these examples inks were prepared from a formulation which were printed by either gravure printing or flexographic printing without further modification. The formulations for these Flexo/Gravure inks are shown if Table 10.

TABLE 10

| Example # | 10 | 11 | 12 |
|---|---|---|---|
| Pigment color | Red | Blue | Yellow |
| Ink Type | Flexographic/ Gravure | Flexographic/ Gravure | Flexographic/ Gravure |
| Pigment | 13.00% | 13.00% | 13.00% |
| Poly(urethane/urea) of Example 3 | 50.00% | 50.00% | 42.80% |
| n-propanol | 16.80% | 16.00% | 15.80% |
| n-propyl acetate | 16.80% | 16.00 | 15.80% |
| 25% polyvinyl butyral solution | 2.40% | 4.00% | 11.60% |
| Calcium carbonate | 0.50% | 0.50% | 0.50% |
| Silica | 0.50% | 0.50% | 0.50% |
| TOTAL | 100.00% | 100.00% | 100.00% |
| Resin/Solvent ratio | 1.49 | 1.56 | 1.35 |

In these formulations the red pigment was Pigment Red 53:1, the blue pigment was Pigment Blue 15:4 and the yellow pigment was Pigment Yellow 14. The components of each ink formulation were mixed in a high speed mixer (Hockmeyer) until a slurry consistency was reached (about 30 minutes). Each slurry was then passed through a horizontal media mill (Eiger) until the pigment is reduced to 10 microns ($\mu$m) or smaller to form the respective inks. Similar inks were prepared as described above except that the poly(urethane/urea) resin of Example 3 was replaced with that of Example 1 or Example 2. Each ink formulation was printed on polypropylene print stock using a respective flexographic printing press or gravure printing press to produce acceptable commercial printed images.

The formulations of Examples 10–12 demonstrate the unique nature of the poly(urethane/urea) of the present invention. Whereas the poly(urethane/urea) of Example 3 is capable of accepting the required solvent ratio to print in both flexographic and gravure printing, commercial gravure inks cannot be so adjusted. For example, when the solvent ratio of a commercial Rotomax gravure ink (Sun Chemical) is adjusted to that of Examples 10–12, the resin in the ink kicks out. Thus the resin in the Rotomax gravure ink was not soluble in the solvent formulations in Table 10.

Comparative Examples A–C

Formulations similar to those in Table 10 were prepared substantially in the same way, except that a the poly (urethane/urea) of this invention was replaced with a conventional resin used in conventional gravure inks; and that the formulation concentrations were adjusted to produce stable inks. The comparative ink formulations which simulate commercial ink formulations are shown in Table 11.

TABLE 11

| Comparative Example | A | B | C |
|---|---|---|---|
| Pigment color | Red | Blue | Yellow |
| Ink Type | Gravure | Gravure | Gravure |
| Pigment | 13.00% | 13.00% | 13.00% |
| Conventional Resin | 46.20% | 47.00% | 39.60% |
| n-propanol | 18.70% | 17.50% | 17.40% |
| n-propyl acetate | 18.70% | 17.50% | 17.40% |
| 25% Polyvinyl butyral solution | 2.40% | 4.00% | 11.60% |
| Calcium carbonate | 0.50% | 0.50% | 0.50% |
| Silica | 0.50% | 0.50% | 0.50% |
| TOTAL | 100.00% | 100.00% | 100.00% |
| Resin/Solvent ratio | 1.24 | 1.34 | 1.14 |

In these formulations the red, blue and yellow pigments were the same as those in Examples 10, 11, and 12 respectively; and the conventional resin is Mitchanol's Surkofilm 71H. These ink formulations were prepared as described in connection with Examples 10, 11, and 12. While the comparative ink formulations A, B and C, could be printed using a gravure printing press, they could not be used in flexographic printing because of poor alcohol solubility.

Example 13

This example demonstrates the versatility of the poly (urethane/urea) of the present invention by comparison with inks containing conventional resins such as used in commercially available inks. Five different film substrates listed in the following Table 12 were printed with a gravure printing press using the ink formulations of Examples 10, 11, and 12 and of comparative Examples A, B, and C.

TABLE 12

| T523 | Oriented, corona treated polypropylene[g] |
| 48LBT | Corona treated polyester[h] |
| M30 | Polyvinyl chloride-coated polyester[i] |
| 813 | Chemically treated polyester[j] |
| 1500 | Treated nylon[k] |

[g]Product of AET,
[h], [i]Products of DuPont,
[j]Product of Melinex,
[k]Product of Allied Signal Printed samples were each tested for extrusion bond strength to polycoated milk-carton board using a Sencorp heat sealer using a jaw pressure of 40 p.s.i. at a 1 dwell time of about I second and a temperature of 300° F. Each laminated board was then tested using an Instron peel testor in which the extrusion bond strength is the number of grams per linear inch (i.e., *gm/l.in) required to break the seal of the film substrate from the board. For all film substrates tested, the flexo/gravure inks of Examples 10, 11, and 12 based on the same poly (urethane/urea) resin produced similar bond strength results. Likewise, all film substrates tested, the gravure inks of Comparative Examples A, B, and C based on the same conventional resin produced similar bond strength results. These results are summarized in Table 13.

TABLE 13

Extrusion Bond Strength

| Film | Examples 10, 11 & 12 Fexo/Gravure Inks | Comp. Example A, B & C Gravure Inks |
|---|---|---|
| T523 | 430 gm/lin in | 50 gm/lin in |
| 48LBT | 490 gm/lin in | 150 gm/lin in |
| M30 | 225 gm/lin in | 0 gm/lin in |
| 813 | 300 gm/lin in | 275 gm/lin in |
| 1500 | 380 gm/lin in | 150 gm/lin in |

The peel strengths in Table 13 demonstrate that the flexo/gravure inks of the present invention, have superior bond strengths on a variety of films as compared to gravure inks containing a conventional gravure ink resin. In addition, the inks of Examples 10–12 exhibit superior resolubility in solvent blends required for flexographic printing.

Example 14

The Inks of Examples 10–12 were also printed on saran coated polyester substrates and nylon films and then laminated to polyethylene using a urethane based adhesive. Each laminate was then subjected to retort conditions by heating in water at 180° F. (about 82° C.) for 45 minutes. Each laminate exhibited acceptable destruct bond values after retort. This performance was surprising since it was achieved without the use of an isocyanate crosslinker which typically is used in commercial ink systems such as Lamiall, INX systems of Sakata. Such isocyanate crosslinkers not only are hazardous to use, but also greatly reduce the shelf life of the ink. Moreover such crosslinkers adversely affects resolubility of the finished ink.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A solvent-soluble poly(urethane/urea) resin derived from a polyurethane prepolymer being the reaction product of:
   (a) a diisocyanate component and a diol component having:
      (i) a first diol having a molecular weight below 2000 and
      (ii) a polymeric diol having a molecular weight below 3000; wherein the —NCO/—OH ratio is less than 2 and containing 1.3 to 6.0 wt. % of unreacted —NCO groups and
   (b) diamine; wherein the amount of diamine is 100% to 120% based on the equivalents of unreacted —NCO groups and the polyurethane prepolymer is added to the diamine, in the absence of monoamine chain terminators, at a controlled rate of between about 3.33 to about 10 weight percent per minute of polyurethane prepolymer.

2. The resin of claim 1 wherein the first diol has a lower molecular weight than the polymeric diol.

3. The resin of claim 1 wherein the nitrogen content of the resin derived from the unreacted —NCO groups of the diisocyanate component is from 1.3 to 6.0 wt. %.

4. The resin of claim 1 wherein the polymeric diol comprises 30 to 80% of the equivalents of the diol component.

5. The resin of claim 1 wherein the —NCO/—OH ratio is between 1 and 2.

6. The resin of claim 1 having a molecular weight between about 10,000 and about 80,000.

7. The resin of claim 1 wherein the diisocyanate component comprises two or more diisocyanate compounds.

8. The resin of claim 1 wherein the diisocyanate component is an aromatic diisocyanate compound, an aliphatic diisocyanate compound, or a mixture thereof.

9. The resin of claim 8 wherein the diisocyanate component is 4,4'-diphenylmethane diisocyanate; 4,4'-dicyclohexyl diisocyanate; hexamethylene diisocyanate; meta-tetramethylene-xylenediisocyanate; isophorone diisocyanate; toluene diisocyanate; or a mixture thereof.

10. The resin of claim 1 wherein the diisocyanate component comprises isophorone diisocyanate.

11. The resin of claim 1 wherein the first diol is selected from the group consisting of aliphatic diols, polyether diols and polycaprolactone diols, and mixtures thereof.

12. The resin of claim 11 wherein the first diol is selected from the group consisting of 1,4 butanediol, 1,5 pentanediol, and alpha-hydro-omega-hydroxy-poly(oxy 1,4 butyldiyl) having a molecular weight of 1000.

13. The resin of claim 11 wherein the first diol is an aliphatic diol.

14. The resin of claim 11 wherein the aliphatic diol is 1,4-butanediol.

15. The resin of claim 1 wherein the polymeric diol has a molecular weight between 425 and 3000.

16. The resin of claim 1 wherein the polymeric diol is a polyether diol or a polycaprolactone diol.

17. The resin of claim 1 wherein the polymeric diol is selected from the group consisting of alpha-hydro-omega-hydroxy-poly(oxy-1,4-butyldiyl), and polypropylene glycol.

18. The resin of claim 17 wherein the polymeric diol is a polycaprolactone.

19. The resin of claim 18 wherein the polycaprolactone has a molecular weight of 2500 or less.

20. The resin of claim 1 wherein the diamine is hydrazine, methylene diamine, ethylene diamine, diamino cyclohexane, hexamethylene diamine, piperazine, or isophorone diamine or mixtures thereof.

21. The resin of claim 20 wherein the diamine is ethylene diamine, isophorone diamine, or a mixture thereof.

22. The resin of claim 1 wherein the organic solvent is an ester or an alcohol/ester mixture.

23. The resin of claim 22 wherein the ester is ethyl acetate or n-propyl acetate; and the alcohol is methanol, ethanol, n-propanol, isopropanol, or butanol.

24. The resin of claim 1 wherein the polyurethane prepolymer has the structure:

OCN—(—A—NH—CO—O—R$_2$—0—CO—NH—)$_n$—A—NH—CO—O—R$_2$—O—CO—NH—A—NCO wherein —A— is an aryl or alkyl group; and R$_2$ comprises R$_3$ and R$_4$; wherein R3 is an alkyl or a polymeric group having a molecular weight below 2000; wherein R4 is a polymeric group having a molecular weight below 3000; wherein n is 1 or 2.

25. The resin of claim 24 wherein the molecular weight of $R_3$ is less than the molecular weight of $R_4$.

26. The resin of claim 24 wherein $R_2$ comprises from about 30 to about 80 equivalent % of $R_4$.

27. The resin of claim 24 wherein the ratio of $R_4$ to $R_3$ ranges between about 90:10 and about 10:90.

28. The resin of claim 1 wherein the poly(urethane/urea) resin has the structure:

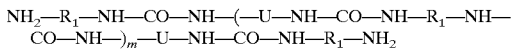

wherein $R_1$ is a covalent bond or a $C_{1-10}$ alkyl group; —U— has the structure; and m is an integer:

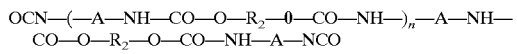

wherein —A— is an aryl or alkyl group; and $R_2$ comprises $R_3$ and $R_4$; wherein R3 is an alkyl or a polymeric group having a molecular weight below 2000; wherein R4 is a polymeric group having a molecular weight below 3000; wherein n is 1 or 2.

29. A solvent-based flexographic and gravure compatible laminating printing ink comprising:
(A) a solvent-soluble poly(urethane/urea) resin derived from a polyurethane prepolymer being the reaction product of:
(a) a diisocyanate component and a diol component having:
(i) a first diol having a molecular weight below 2000 and
(ii) a polymeric diol having a molecular weight below 3000; wherein the —NCO/—OH ratio is less than 2 and containing 1.3 to 6.0% by weight of unreacted —NCO groups, and
(b) diamine; wherein the amount of diamine is 100% to 120% based on the equivalents of unreacted —NCO groups and the polyurethane prepolymer is added to the diamine, in the absence of monoamine chain terminators, at a controlled rate of between about 3.3 to about 10 weight percent per minute of polyurethane prepolymer,
(B) a colorant; and
(C) an organic solvent.

30. The ink of claim 29 wherein the colorant is a pigment, dye or a mixture thereof.

31. The ink of claim 29 wherein the organic solvent is an ester or an alcohol/ester mixture.

32. The ink of claim 31 wherein the ester is ethyl acetate or n-propyl acetate; and the alcohol is methanol, ethanol, n-propanol, isopropanol, or butanol.

33. The ink of claim 29 further comprising a polymeric dispersant.

34. The ink of claim 33 wherein the polymeric dispersant is a nitrocellulose.

35. The ink of claim 33 wherein the polymeric dispersant is a polyvinyl butyral.

36. The gravure compatible laminating printing ink of claim 29 comprising:
about 8 to about 60 wt. % solvent-soluble poly(urethane/urea) resin;
about 3 to about 30 wt. % colorant; and
about 15 to about 60 wt. % organic solvent.

37. The flexographic compatible laminating printing ink of claim 29 comprising:
about 8 to about 60 wt. % solvent-soluble poly(urethane/urea) resin;
about 3 to about 30 wt. % colorant; and
about 15 to about 60 wt. % organic solvent.

38. The ink of claim 29 further comprising an ink viscosity between 15 and 30 seconds as measured using a #2 efflux cup.

39. A method for printing on a polymeric substrate comprising the steps:
applying the laminating ink of claim 29 onto the surface of the polymeric substrate to form an image; and
drying the image to form a polymeric substrate having a tack-free, firmly adherent laminating ink which is un-blocked when contacted under pressure at ambient temperatures with a second surface of the substrate.

40. The method of claim 39 wherein the ink is applied to the polymeric substrate with a flexographic printing press.

41. The method of claim 39 wherein the ink is applied to the polymeric substrate with a gravure printing press.

42. The method of claim 39 further comprising applying a second substrate surface to the image to form a laminate.

43. The method of claim 42 wherein the second substrate surface is formed by melt extrusion.

44. The method of claim 42 wherein the second substrate surface has an adhesive surface.

45. The method of claim 42 further comprising subjecting the laminate to retort conditions, thereby forming a retorted laminate wherein the image remains substantially unchanged and is free of delamination defects.

46. The method of claim 39 wherein the polymeric substrate is polyethylene, polypropylene, polyethylene terephthalate, cellulose acetate, cellulose acetate butyrate, polycarbonate, polyamide, polyvinyldichloride coated polyethylene terephthalate, polyvinyldichloride coated polypropylene, metallized polyethylene terephthalate, and metallized polypropylene.

47. The method of claim 39 wherein the polymeric substrate is a polypropylene or a polyester film or sheet.

48. The method of claim 42 wherein the second substrate is a polymeric substrate.

49. The method of claim 42 wherein the second substrate is a polyethylene.

* * * * *